United States Patent
Fukumoto et al.

(10) Patent No.: US 8,192,804 B2
(45) Date of Patent: *Jun. 5, 2012

(54) PHOTOCURABLE INK COMPOSITION, INK JET RECORDING METHOD, AND RECORDING MATTER

(75) Inventors: Hiroshi Fukumoto, Shiojori (JP); Keitaro Nakano, Matsumoto (JP); Takashi Oyanagi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 900 days.

This patent is subject to a terminal disclaimer.

(21) Appl. No.: 12/188,429

(22) Filed: Aug. 8, 2008

(65) Prior Publication Data

US 2009/0280302 A1    Nov. 12, 2009

(30) Foreign Application Priority Data

Aug. 8, 2007 (JP) ................... 2007-207234
Aug. 4, 2008 (JP) ................... 2008-200962

(51) Int. Cl.
*C08J 7/04* (2006.01)
*C08F 2/46* (2006.01)

(52) U.S. Cl. ............ 427/511; 522/16; 522/68; 522/104; 522/130; 522/182; 524/1

(58) Field of Classification Search ............... 427/511; 522/16, 68, 104, 130, 182; 524/1
See application file for complete search history.

(56) References Cited

U.S. PATENT DOCUMENTS

| 4,507,466 | A | 3/1985 | Tomalia et al. |
| 4,558,120 | A | 12/1985 | Tomalia et al. |
| 4,568,737 | A | 2/1986 | Tomalia et al. |
| 4,587,329 | A | 5/1986 | Tomalia et al. |
| 4,631,337 | A | 12/1986 | Tomalia et al. |
| 4,694,064 | A | 9/1987 | Tomalia et al. |
| 5,041,516 | A | 8/1991 | Freichet et al. |
| 2004/0166249 | A1 | 8/2004 | Siegel |
| 2007/0249750 | A1* | 10/2007 | Oyanagi et al. ............. 522/84 |
| 2008/0090930 | A1* | 4/2008 | Madhusoodhanan et al. .. 522/83 |

FOREIGN PATENT DOCUMENTS

| JP | 2004-099796 | 4/2004 |
| JP | 2006-176734 | 7/2006 |
| JP | 2007-100054 | 4/2007 |
| JP | 2007182536 A | 7/2007 |
| JP | 2007314744 A | 12/2007 |
| JP | 2007314775 A | 12/2007 |
| JP | 2008120991 A | 5/2008 |
| WO | WO 03/089486 | 10/2003 |

* cited by examiner

*Primary Examiner* — Timothy J. Kugel
(74) *Attorney, Agent, or Firm* — Nutter McClennen & Fish LLP; John J. Penny, Jr.

(57) ABSTRACT

A photocurable ink composition includes a dendritic polymer, a monomer expressed by $CH_2=CR^1-COO-R^2-O-CH=CH-R^3$ ($R^1$ denotes a hydrogen atom or a methyl group, $R^2$ denotes an organic residue having a carbon number of 2 to 20, and $R^3$ denotes a hydrogen atom or an organic residue having a carbon number of 1 to 11), and a photopolymerization initiator.

8 Claims, No Drawings

PHOTOCURABLE INK COMPOSITION, INK JET RECORDING METHOD, AND RECORDING MATTER

Priority is claimed to Japanese Patent Applications No. 2007-207234, filed Aug. 8, 2007, and No. 2008-200962, filed Aug. 4, 2008, the disclosures of which, including the specifications, drawings and claims, are incorporated herein by reference in their entireties.

BACKGROUND

1. Technical Field

The present invention relates to a photocurable ink composition, an ink jet recording method using the same, and a recorded material.

2. Related Art

A photocurable ink composition is used for manufacture of a color filter, printing on a printed board, printing on a plastic card, a vinyl sheet or a plastic component, printing of a large-sized signboard or an indoor/outdoor advertisement, or printing of a barcode or a date.

Japanese Unexamined Patent Application No. 2004-99796 discloses a photocurable ink composition including dendrimer which is a kind of dendritic polymer. The dendritic polymer has a molecule structure in which a functional group is dense in the surface with high density compared with a general linear polymer and thus is expected as a functional polymer nano material.

However, if the dendritic polymer is added to the ink composition, the viscosity of an ink is significantly increased and thus, even in view of storage stability, a discharge failure of an ink jet head may occur due to the increase of the viscosity. In order to suppress the increase of the viscosity, the reduction of the addition amount of the dendritic polymer has a tradeoff relation with the characteristic improvement due to the adding of the dendritic polymer.

As a general method of preventing the high viscosity of the ink, there is a method of using a low-viscosity polymerizable compound as a diluted monomer. However, the low-viscosity monomer generally has a low molecular weight, a low flash point, and problems in stability, such as odor and skin irritability. As another method, water or an organic solvent without polymerizable functional group as a low-viscosity dilution agent is added. However, when a component which does not contribute to a curing reaction is added, a drying process should be performed by a heating or ventilating unit as a pre-process of the curing reaction, or a special process of providing an absorbing layer on a recording medium needs to be performed. Accordingly, a process load is undesirably increased. When the curing reaction is performed in a state in which the drying process is insufficient, a residual solvent or residual moisture is foamed by heat of polymerization or is extruded from a cured material, is bled out and is left on the surface of the cured film, thereby causing tackiness (stickiness).

SUMMARY

An advantage of some aspects of the invention is that it provides a photo-curable ink composition with excellent storage stability, stability and curing properties and excellent film quality after curing, an ink cartridge using the same, an ink jet recording method, and a recorded material.

According to an aspect of the invention, there is provided a photocurable ink composition comprising a dendritic polymer; a monomer expressed by $CH_2=CR^1—COO—R^2—O—CH=CH—R^3$ ($R^1$ denotes a hydrogen atom or a methyl group, $R^2$ denotes an organic residue having a carbon number of 2 to 20, and $R^3$ denotes a hydrogen atom or an organic residue having a carbon number of 1 to 11); and a photopolymerization initiator.

The dendritic polymer may be a dendrimer and/or a hyperbranched polymer.

The monomer may be 2-(vinyloxyethoxy)ethyl acrylate and/or 2-(vinyloxyethoxy)ethyl methacrylate.

The concentration of the dendritic polymer may be in a range from 3% by weight to 30% by weight.

The photo-curable ink composition may further include a coloring material.

The photopolymerization initiator may be obtained by mixing any one kind or two or more kinds of α-aminoketone, α-hydroxyketone, and acylphosphine oxide.

According to another aspect of the invention, there is provided an ink jet recording method comprising performing recording using the photocurable ink composition.

According to another aspect of the invention, there is provided a recorded material recorded using the photo-curable ink composition.

According to an aspect of the invention, it is possible to provide a photo-curing ink composition which is excellent in storage stability, stability, curing properties and film quality after curing. According to another aspect of the invention, it is possible to provide an ink jet recording method which is excellent in storage stability, stability, a curing rate and film quality, and a recorded material having excellent film quality.

DESCRIPTION OF EXEMPLARY EMBODIMENT

Hereinafter, the exemplary embodiments of the present invention will be described.

Photo-Curable Ink Composition

An photo-curable ink composition according to the present embodiment includes a dendritic polymer and a monomer expressed by Formula $CH_2=CR^1—COO—R^2—O—CH=CH—R^3$ ($R^1$ denotes a hydrogen atom or a methyl group, $R^2$ denotes an organic residue having a carbon number of 2 to 20, and $R^3$ denotes a hydrogen atom or an organic residue having a carbon number of 1 to 11). The photo-curable ink composition according to the present embodiment includes a photo-polymerization initiator and a coloring material (coloring agent) in addition to the above component.

According to the present embodiment, by adding the dendritic polymer to the ink composition, it is possible to improve curing properties of the ink composition and film quality after curing. In order to suppress the increase of the viscosity due to the addition of the dendritic polymer, a monomer is added to the ink composition. The monomer of the present invention contributes to a polymerization reaction and thus does not need to be subjected to an additional process such as a drying process. Since a general low-viscosity monomer has a low flash point, a stability problem may occur in the addition to the ink composition. However, in the present embodiment, by employing the monomer expressed by the above formula, it is possible to suppress the decrease of the flash point, and improve the stability of the ink composition. In addition, the monomer has excellent curing properties.

The dendritic polymer can be roughly classified into six structures as described below (see Keigo AOI and Masaaki KAKIMOTO Ed., Dendritic Polymers—Highly functionalized world by which the multi-branched structure is widened—(in Japanese), published by NTS Inc.).

I Dendrimer

II Linear dendritic polymer
III Dendri-graft polymer
IV Hyperbranched polymer
V Star-hyperbranched polymer
VI hyper-graft polymer Of these, I to III have a degree of branching (DB) of 1 and have a defect-free structure, whereas IV to VI have a random branched structure which may contain a defect. In particular, as compared with generally used linear high-molecular weight compounds, a dendrimer has a possibility to dispose a reactive functional group in a high density and with concentration on the outermost plane thereof and is highly expected as a functional high-molecular weight material. Also, a hyperbranched polymer, although not comparable to the dendrimer, has a possibility to introduce a number of reactive functional groups on the outermost layer thereof and has excellent curing properties.

Different from conventional linear high-molecular weight compounds or branched high-molecular weight compounds, these dendritic polymers repeat a three-dimensional branched structure and are highly branched. For that reason, as compared with linear high-molecular weight compounds having the same molecule, the dendritic polymers have a possibility to control the viscosity on a low level.

Examples of a synthetic method of a dendrimer which can be used in the present embodiment include a divergent method in which the synthesis is performed from the center toward the outside and a convergent method in which the synthesis is performed from the outside toward the center.

As the dendrimer and hyperbranched polymer which can be used in the present embodiment, ones which are solids at room temperature and which have number average molecular weights ranging from 1,000 to 100,000 are desirable; and in particular, ones having number average molecular weights ranging from 2,000 to 50,000 are preferably used. In the case where the polymer is not a solid at room temperature, the maintenance properties of a formed image become worse. Also, in the case where the molecular weight is lower than the foregoing range, a fixed image becomes brittle; whereas in the case where the molecular weight exceeds the foregoing range, even when the addition amount is decreased, the viscosity of an ink is excessively high so that the ink is not practically useful in view of a flying characteristic.

Also, the dendrimer and hyperbranched polymer which can be used in the present embodiment are preferably a dendrimer and a hyperbranched polymer, respectively, each of which has a radical polymerizable functional group on the outermost plane thereof. By employing a structure in which radical polymerization can be achieved on the outermost plane thereof, a polymerization reaction rapidly proceeds.

Examples of the polymer having a dendrimer structure include amidoamine based dendrimers (as described in U.S. Pat. Nos. 4,507,466, 4,558,120, 4,568,737, 4,587,329, 4,631,337 and 4,694,064) and phenyl ether based dendrimers (as described in U.S. Pat. No. 5,041,516 and Journal of American Chemistry, Vol. 112, pages 7638 to 7647 (1990)). As to the amidoamine based dendrimer, a dendrimer having a terminal amino group and a methyl carboxylate group is commercially available as "STARBURST™ (PAMAM)" from Aldrich. Also, the terminal amino group of such an amidoamine based dendrimer can be allowed to react with an acrylic acid derivative or a methacrylic acid derivative of various kinds to synthesize an amidoamine based dendrimer having a corresponding terminal, which is then provided for use.

Examples of the acrylic acid derivative or methacrylic acid derivative which can be used include, but are not limited to, acrylic acid or methacrylic acid alkyl esters of methyl, ethyl, n-butyl, t-butyl, cyclohexyl, palmityl, stearyl, etc.; and acrylic acid or methacrylic acid alkylamides of acrylamide, isopropylamide, etc.

Also, as to the phenyl ether based dendrimer, various compounds are described in, for example, Journal of American Chemistry, Vol. 112, pages 7638 to 7647 (1990). For example, it is described that 3,5-dihydroxybenzyl alcohol is used and allowed to react with 3,5-diphenoxybenzyl bromide to synthesize a second-generation benzyl alcohol; an OH group thereof is converted to Br by using $CBr_4$ and triphenylphosphine; thereafter, the resulting benzyl alcohol is similarly allowed to react with 3,5-dihydroxybenzyl alcohol to synthesize a next-generation benzyl alcohol; and subsequently, the foregoing reactions are repeated to synthesize a desired dendrimer. As to the phenyl ether based dendrimer, the terminal can be substituted with one having a chemical structure of various kinds in place of the terminal benzyl ether linkage. For example, in synthesizing the dendrimer as described in Journal of American Chemistry, Vol. 112, by using an alkyl halide of various kinds in place of the foregoing benzyl bromide, a phenyl ether based dendrimer having a terminal structure having a corresponding alkyl group is obtainable. Besides, polyamine based dendrimers (as described in Macromol. Symp., 77, 21 (1994)) and derivatives thereof having a modified terminal group can be used.

As the hyperbranched polymer, for example, hyperbranched polyethylene glycol can be used. The hyperbranched polymer is one obtained by synthesizing a target polymer in one stage by using a monomer having two or more reaction points of one kind corresponding to a branched portion and only one reaction point of another kind corresponding to a connecting portion in one molecule thereof (see Macromolecules, Vol. 29, pages 3831 to 3838 (1996)). Examples of a monomer for the hyperbranched polymer include 3,5-dihydroxybenzoic acid derivatives. When an example of the production of the hyperbranched polymer is concerned, poly[bis(triethylene glycol)benzoate], which is a hyperbranched polymer, can be synthesized by heating methyl 3,5-bis((8'-hydroxy-3',6'-dioxaoctyl)oxy)benzoate which is a hydrolyzate of methyl 3,5-bis((8'-(t-butyldiphenyloxy)-3',6'-dioxaoctyl)oxy)benzoate obtainable from 1-bromo-8-(t-butyldiphenyloxy)-3,6-dioxaoctane and methyl 3,5-dihydroxybenzoate together with dibutyltin diacetate under a nitrogen atmosphere.

In the case where 3,5-dihydroxybenzoic acid is used, since the hyperbranched polymer terminal group is a hydroxyl group, a hyperbranched polymer having a terminal group of various kinds can be synthesized by using an appropriate alkyl halide with respect to this hydroxyl group.

In a monodispersed polymer or hyperbranched polymer having a dendrimer structure or the like, its characteristic is dominated by a chemical structure of the principal chain and a chemical structure of the terminal group. In particular, its characteristic is largely different depending upon a difference of the terminal group or the substituent in the chemical structure. In particular, a polymer having a polymerizable group in a terminal thereof has a large gelation effect after photoreaction and is useful because of its reactivity. The dendrimer having a polymerizable group is obtained through chemical modification with a polymerizable group-containing compound in a terminal of a polymer having a basic atomic group such as an amino group, a substituted amino group and a hydroxyl group in a terminal thereof.

For example, the dendrimer having a polymerizable group is synthesized by adding, for example, an isocyanate group-containing vinyl compound to a polyfunctional compound obtained by subjecting an amino based dendrimer to Michael addition with an active hydrogen-containing (meth)acrylate based compound. Also, a dendrimer having a polymerizable group in a terminal thereof is obtained by allowing an amino based dendrimer to react with (meth)acrylic acid chloride, etc. Examples of such a vinyl compound capable of giving a polymerizable group include compounds having a radical polymerizable, ethylenically unsaturated bond. Examples of such a compound having a radical polymerizable, ethylenically unsaturated bond include unsaturated carboxylic acids, for example, acrylic acid, methacrylic acid, itaconic acid, crotonic acid, isocrotonic acid and maleic acid, and salts thereof; and various compounds having a radical polymerizable, ethylenically unsaturated bond as described below.

Furthermore, examples of the polymerizable group include cationic polymerizable group-containing terminal groups. Such a terminal group can be introduced by allowing a compound having a polymerizable group which is polymerized upon cationic polymerization (for example, an epoxy group and an oxetanyl group), such as cyclic ether compounds (for example, oxirane and oxetane), alicyclic polyepoxides, polyglycidyl esters of a polybasic acid and polyglycidyl ethers of a polyhydric alcohol, to react with the foregoing amino based dendrimer. For example, by allowing chloromethyl oxirane to react with the amino based dendrimer, a cationic polymerizable group of an epoxy type can be introduced in a terminal thereof. Besides, examples of the terminal group include cationic polymerizable groups selected among styrene derivatives, vinylnaphthalene derivatives, vinyl ethers and N-vinyl compounds.

In the present embodiment, the dendrimer and the hyperbranched polymer of one kind may be solely or together with dendrimber and hyperbranched polymer of another kind.

As the hyperbranched polymer, for example, Viscoat #1000 manufactured by OSAKA ORGANIC CHEMICAL INDUSTRY LTD. is available.

The addition amount of the dendritic polymer is preferably 3 to 30% by weight and more preferably 5 to 25% by weight. If the addition amount of the dendritic polymer is less than 3% by weight, the film quality after curing is insufficient, and if the addition amount of the dendritic polymer is greater than 30% by weight, the storage stability of the ink composition becomes worse.

The monomer used in the present embodiment is vinyl ether group-containing (meth)acrylic acid esters expressed by the following formula.

$$CH_2=CR^1-COO-R^2-O-CH=CH-R^3 \quad (1)$$

($R^1$ denotes a hydrogen atom or a methyl group, $R^2$ denotes an organic residue having a carbon number of 2 to 20, and $R^3$ denotes a hydrogen atom or an organic residue having a carbon number of 1 to 11).

The monomer of one kind may be used solely or together with vinyl ether group-containing (meth)acrylic acid esters.

As the organic residue having the carbon number of 2 to 20 expressed by $R^2$ in the general formula (1), an alkylene group having a straight chain shape, a branch shape or an annular shape and having a carbon number of 2 to 20, an alkylene group having a carbon umber of 2 to 20 and having oxygen atoms an ester bond and/or an ester bond in the structure, and a substitutable aromatic group having a carbon number of 6 to 11 are suitable. Of these, an alkylene group having a carbon number of 2 to 6 or an alkylene group having a carbon number of 2 to 9 and having hydrogen atoms by an ether bond in the structure are suitably used.

As the organic residue having the carbon number of 1 to 11 expressed by $R^3$ in the general formula (1), an alkyl group having a straight chain shape, a branch shape or an annular shape and having a carbon number of 1 to 10 and a substitutable aromatic group having a carbon number of 6 to 11 are suitable. Of them, an alkyl group having a carbon number of 1 to 2 and an aromatic group having a carbon number of 6 to 8 are suitably used.

The monomer expressed by the general formula (1) includes 2-vinyloxyethyl(meth)acrylate, 3-vinyloxypropyl (meth)acrylate, 1-methyl-2-vinyloxyethyl(meth)acrylate, 2-vinyloxypropyl(meth)acrylate, 4-vinyloxybutyl(meth) acrylate, 1-methyl-3-vinyloxypropyl(meth)acrylate, 1-vinyloxymethylpropyl(meth)acrylate, 2-methyl-3-vinyloxypropyl(meth)acrylate, 3-methyl-3-vinyloxypropyl(meth) acrylate, 1,1-dimethyl-2-vinyloxyethyl(meth)acrylate, 3-vinyloxybutyl(meth)acrylate, 1-methyl-2-vinyloxypropyl (meth)acrylate, 2-vinyloxybutyl(meth)acrylate, 4-vinyloxycyclohexyl(meth)acrylate, 5-vinyloxypentyl (meth)acrylate, 6-vinyloxyhexyl(meth)acrylate, 4-vinyloxymethylcyclohexylmethyl (meth)acrylate, p-vinyloxymethylphenylmethyl (meth)acrylate, 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl (meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)propyl(meth)acrylate, 2-(vinyloxyisopropoxyethoxy)propyl(meth)acrylate, 2-(vinyloxyethoxyethoxy) isopropyl(meth)acrylate, 2-(vinyloxyethoxyisopropoxy) isopropyl(meth)acrylate, 2-(vinylethoxyethoxy) isopropyl(meth)acrylate, polyethylene glycol monovinyl ether(meth)acrylate, and polypropylene glycol monovinyl ether(meth)acrylate.

Of these, from the viewpoint of low viscosity, a high flash point, excellent curing properties, 2-(vinyloxyethoxy)ethyl (meth)acrylate, that is, 2-(vinyloxyethoxy)ethyl acrylate (VA), and 2-(vinyloxyethoxy)ethyl methacrylate (VM) are suitable. The VA is more excellent than the VM in view of the curing properties.

As a method of manufacturing the monomer, a method of esterfying (meth)acrylate and hydroxyl group-containing vinyl ethers (method A), a method of esterfying (meth)acrylate halide and hydroxyl group-containing vinyl ethers (method B), a method of esterfying (meth)acrylate anhydride and hydroxyl group-containing vinyl ethers (method C), a method of ester-exchanging (meth)acrylate esters and hydroxyl group-containing vinyl ethers (method D), a method of esterfying (meth)acrylate and halogen-containing vinyl ethers (method E), and a method of esterfying alkali (earth)metal salts and halogen-containing vinyl ethers (method F) are suitable. Of these, a method of ester-exchanging (meth)acrylate esters and hydroxyl group-containing vinyl esters (method D) is very suitable and the operation and the effect of the present embodiment are more sufficiently achieved.

The addition amount of the monomer is preferably 20 to 90% by weight and more preferably 30 to 80% by weight in the ink composition.

As the photopolymerization initiator, a material having sensitivity with respect to an irradiated active ray, for example, an ultraviolet ray of 400 to 200 nm, a far-infrared ray, a g-ray, a h-ray, an i-ray, a KrF excimer laser light beam, an ArF excimer laser light beam, an electron ray, an X-ray, a molecular beam, or an ion beam may be selectively used.

As the photopolymerization initiator, the material which is known to those skilled in the art may be used. Specific examples thereof are described, for example, in Bruce M. Monroe et al., Chemical Revue, 93, 435 (1993); R, S. Davidson, Journal of Photochemistry and biology, A: Chemistry, 73, 81 (1993); J. P. Faussier, "Photoinitiated Polymerization-Theory and Applications": Rapra Review vol. 9, Report, Rapra Technology (1998); and M. Tsunookaetal., Prog. Polym. Sci., 21, 1 (1996). Many compounds favorably used in chemical-amplification photoresists and for photo-cation-polymerization are also described in Japanese Research Association for Organic Electronics Materials Ed., "Organic Materials for Imaging" (published by Bun-Shin Shuppan (1993), pp. 187 to 192). The compounds that undergo oxidative or reductive bond cleavage through the interaction with the electronically-excited state of sensitizing dye are also known, and described, for example in F. D. Saeva, Topics in Current Chemistry, 156, 59 (1990); G. G. Maslak, Topics in Current Chemistry, 168, 1 (1993); H. B. Shuster et al., JACS, 112, 6329 (1990); I. D. F. Eaton et al., JACS, 102, 3298 (1980).

Preferable photopolymerization initiator includes (a) aromatic ketones, (b) aromatic onium salt compounds, (c) organic peroxides, (d) hexaarylbiimidazole compounds, (e) ketoxime ester compounds, (f) borate compounds, (g) azinium compounds, (h) metallocene compounds, (i) active ester compounds, and (j) compounds containing a carbon-halogen bond. More preferably, the photo-polymerization initiator is obtained by one kind or two or more kind of α-aminoketone, α-hydroxyketone, and acylphosphine oxide.

As the initiator, photo-polymerization initiators which are commercially available as trade names of VICURE 10 and 30 (manufactured by Stauffer Chemical), Irgacure 127, 184, 500, 651, 2959, 907, 369, 379, 754, 1700, 1800, 1850, 1870, 819, OXE01, Darocur1 1173, TPO, ITX (manufactured by Ciba Specialty Chemicals), Quantacure CTX (manufactured by Aceto Chemical), Kayacure DETX-S (manufactured by Nippon Kayaku Co. Ltd.), and ESACURE KIP150 (manufactured by Lamberti) can be used.

The addition amount of the polymerization initiator is preferably 1 to 20% by weight and more preferably 2 to 10% by weight in the ink composition.

In the composition according to the present embodiment, a coloring material which can be generally used in the ink may be used without special limitation. The color material may include a pigment and a dye. In particular, as the coloring material used in this case, the pigment is advantageous in the durability of a printed material.

As the dye, various types of dyes used for ink jet recording such as a direct dye, an acid dye, a food dye, a basic dye, a reactive dye, a dispersive dye, a vat dye, a soluble vat dye, and a reactive dispersive dye may be used.

As the pigment, an organic pigment or an inorganic pigment may be used without special limitation. As the inorganic pigment, in addition to titanium oxide and iron oxide, carbon black manufactured by known methods such as a contact method, a furnace method and a thermal method may be used. As the organic pigment, azo pigments (including azo lake pigment, insoluble azo pigment, condensed azo pigment, chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitrosopigments, and aniline black may be used.

As the detailed examples of the pigment, the examples of the carbon black include C.I. Pigment Black 7; No. 2300, No. 900, MCF88, No. 33, No. 40, No. 45, No. 52, MA7, MA8, MA100, No. 2200B, and so forth made by Mitsubishi Chemical Corporation; Raven 5750, 5250, 5000, 3500, 1255, 700, and so forth made by Columbia; Regal 400R, 330R, and 660R, Mogul L and 700, Monarch 800, 880, 900, 1000, 1100, 1300, and 1400, and so forth made by Cabot; Color Black FW1, FW2, FW2V, FW18, and FW200, Color Black S150, S160, and S170, Printex 35, U, V, and 140U, Special Black 6, 5, 4A, and 4, and so forth made by Degussa.

The examples of the pigment used in a yellow ink include C. I. pigment yellow 1, 2, 3, 12, 13, 14, 16, 17, 73, 74, 75, 83, 93, 95, 97, 98, 109, 110, 114, 120, 128, 129, 138, 150, 151, 154, 155, 180, 185 and 213.

The examples of the pigment used in a magenta ink include C. I. pigment red 5, 7, 12, 48(Ca), 48(Mn), 57(Ca), 57:1, 112, 122, 123, 168, 184, 202, 209 and C. I. pigment violet 19.

The examples of the pigment used in a cyan pigment include C. I. pigment blue 1, 2, 3, 15:3, 15:4, 60, 16 and 22.

According to the preferable embodiment of the present embodiment, the average particle diameter of the pigment is preferably in a range from 10 to 200 nm and more preferably a range from 50 to 150 nm. The addition amount of the coloring material in the ink composition is preferably in a range from 0.1 to 25% by weight and more preferably 0.5 to 15% by weight.

If the ink composition includes the coloring material, there are a plurality of ink compositions including respective coloring materials. For example, if colors lighter or darker than the respective colors are added in addition to four basic colors such as yellow, magenta, cyan and black, light magenta lighter than magenta, red darker than the magenta, light cyan lighter than cyan, blue darker than cyan, gray and light black lighter than black, and a mat black darker than black may be used.

If the pigment is used as the coloring material, it is preferable that a dispersant is added to the ink composition. As the dispersant, for example, polyoxyalkylenepolyalkylenepolyamine $(C_2H_{4n}N)_n$—$(PO)_x$-$(EO)_y$—OH (in this formula, n, x and y denote integers of 1 or more, PO denotes propylene oxide, and EO denotes ethylene oxide) may be used. The detailed examples of polyoxyalkylenepolyalkylenepolyamine include, for example, Discole N-503, N-506, N-509, N-512, N-515, N-518 and N-520.

The addition amount of the dispersant is preferably 0.1 to 20% by weight and more preferably 0.5 to 10% by weight.

Other additive agents may be added to the photo-curable ink composition according to the present embodiment, if necessary.

As the additive agent, a material selected from a polymerization promoter, a resin emulsion, a wetting agent, a pH adjuster, a surfactant, an antiseptic agent and a mildew-proofing agent may be added, if necessary. One kind or two or more kinds of these components may be used. The additive agent may not be added, if necessary. Preferable amounts of preferable additive agents may be used in a range which the effect of the invention does not deteriorate.

The ink composition of the present embodiment is manufactured by including the components properly selected from the above-described components, but the viscosity of the ink composition which can be obtained is preferably less than 25 mPa·s at 20° C. In the present embodiment, the surface tension of the ink composition is preferably equal to or less than 45 mN/m at 20° C. and more preferably in a range of 25 to 45 mN/m. By adjusting the viscosity and the surface tension, it is possible to obtain an ink composition having preferable characteristics so as to be used in an ink jet recording method. The adjustment of the viscosity and the surface tension is performed by properly adjusting the addition amount of the monomer included in the ink composition.

As a method of manufacturing the ink composition, a method of mixing and uniformly dissolving various kinds of components included in the ink composition, pressurizing and filtering the components by a membrane filter having a hole diameter of 0.8 μm, and deaerating an additionally obtained solution using a vacuum pump so as to manufacture the ink composition may be used and is not limited thereto.

The above-described photocurable ink composition is used as the ink cartridge in which one kind or two or more kinds of photo-curable ink composition is integrally or independently received. Accordingly, it is possible to facilitate the treatment of the ink composition. The ink cartridge including the ink composition is known in the present technical field and may be used as the ink cartridge using properly the known method.

The ink cartridge may be used for a general writing instrument, a recording system, and a pen plotter, but is more preferably used for an ink jet recording method.

Ink Jet Recording Method

In the ink jet recording method according to the present embodiment, the photocurable ink composition having the above-described composition is discharged onto a recording medium, an ultraviolet ray is irradiated onto, and liquid droplets are cured.

As the recording medium, various recording mediums such as plain paper, ink jet dedicated paper (mat paper or glossy paper), glass, plastic, film, metal printed board may be used without special limitation.

The preferable conditions of the irradiation of the ultraviolet ray are properly selected by the amount or the thickness of the ink composition attached to the board or the recording medium. Accordingly, the conditions cannot be strictly specified, but, for example, the wavelength of the light irradiated from a light irradiating apparatus is preferably in a range of 350 to 450 nm.

The irradiation amount of the ultraviolet ray is in a range from 10 mJ/cm$^2$ to 10,000 mJ/cm$^2$ and preferably 50 mJ/cm$^2$ to 6,000 mJ/cm$^2$. If the ultraviolet ray is irradiated in this range, the curable reaction of the photo-radical curable ink composition can be sufficiently performed.

The irradiation of the ultraviolet ray may be accomplished by a metal halide lamp, a xenon lamp, a carbon arc lamp, a chemical lamp, a low pressure mercury vapor lamp, a high pressure mercury vapor lamp, and other such lamps. For example, a commercially available source such as an H lamp, D lamp, or V lamp made by Fusion System can be used. The irradiation of the ultraviolet ray can also be accomplished by using an ultraviolet ray light emitting diode (UV LED), an ultraviolet ray light emitting semiconductor laser, or other such ultraviolet ray light emitting semiconductor element, in order to reduce energy consumption.

The examples of the method of discharging the photocurable ink composition include the following methods. A first method is a method called an electrostatic suction method. The electrostatic suction method is a method of applying a strong ampere meter between acceleration electrodes disposed on the front sides of the nozzles, continuously ejecting ink droplets from the nozzles, applying print information signals to deflection electrodes while the ink droplets pass between the deflection electrodes, flying the ink droplets toward a recording medium, fixing the ink onto the recording medium, and recording an image or a method of ejecting ink droplets from nozzles onto a recording medium according to a print information signal and fixing and recording an image on the recording medium.

A second method is a method of applying pressure to an ink solution by a small-sized pump, mechanically vibrating ink jet nozzles by a crystal oscillator and forcedly ejecting ink droplets from the nozzles or a method of ejecting and charging ink droplets ejected from nozzles, applying print information signals to deflection electrodes while the ink droplets pass between the deflection electrodes, flying the ink droplets toward a recording medium, and recording an image on the recording medium.

A third method is a method of applying pressure and print information signals to an ink solution by a piezoelectric element, ejecting ink droplets from nozzles onto a recording medium, and recording an image on the recording medium.

A fourth method is a method of heating and foaming an ink solution using minute electrodes according to print information signals, expanding air bubbles, ejecting the ink solution from nozzles onto a recording medium, and recording an image on the recording medium.

Recorded Material

In a recorded material according to the present embodiment, recording is performed by an ink jet recording method using the photocurable ink composition. Since the recorded material is obtained by the ink jet recording method using the above-described photo-curable ink composition, printing quality is excellent, printing stability is excellent, a beautiful chromogenic state is obtained, and the chromogenic state can be maintained for a long period of time.

Embodiment A

Hereinafter, the following embodiments of the invention will be described in detail, but the invention is not limited to the embodiments.

The ink composition shown in Table 1 was manufactured by a general method.

TABLE 1

|  |  | Embodiment | | | | | | | | Comparative Example | | | |
| --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 |
| Monomer | VA | 69.6 | — | 64.2 | 74.8 | 82.6 | 53.6 | 54.6 | 81.6 | — | — | — | 84.8 |
|  | VM | — | 69.6 | — | — | — | — | — | — | — | — | — | — |
|  | Isobornyl acrylate | — | — | — | — | — | — | — | — | 69.6 | — | — | — |
|  | Isobutyl acrylate | — | — | — | — | — | — | — | — | — | 69.2 | — | — |
|  | t-butyl acrylate | — | — | — | — | — | — | — | — | — | — | 69.6 | — |
|  | Hyperbranched polymer (viscoat 1000) | 15 | 15 | 20 | 10 | 2 | 31 | 30 | 3 | 15 | 15 | 15 | — |
|  | Irgacure819 | 6 | — | — | 6 | 6 | 6 | — | 6 | — | — | — | — |
|  | Irgacure1870 | — | 6 | 6 | — | — | — | 6 | — | 6 | 6 | 6 | 6 |
|  | Irgacure127 | 2 | 2 | 2 | 2 | 2 | 2 | 2 | 2 | 2 | 2 | 2 | 2 |

TABLE 1-continued

|  | Embodiment | | | | | | | | Comparative Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Pigment black-7 | 6 | — | — | — | 6 | 6 | 6 | 6 | — | — | 6 | — |
| Pigment blue-15:3 | — | 6 | — | — | — | — | — | — | 6 | — | — | — |
| Pigment violet-19 | — | — | 6 | — | — | — | — | — | — | 6 | — | — |
| Pigment yellow-155 | — | — | — | 6 | — | — | — | — | — | — | — | 6 |
| Dispersant (polyoxy alkylene polyalkylene polyamine) | 1.4 | 1.4 | 1.8 | 1.2 | 1.4 | 1.4 | 1.4 | 1.4 | 1.4 | 1.8 | 1.4 | 1.2 |

In the table, the details of the components are as follows.

VA: 2-(vinyloxyethoxy)ethyl acrylate included in the general formula (1)

VM: 2-(vinyloxyethoxy)ethyl isobornyl acrylate Isobutylacrylate included in the general formula (1), t-butylacrylate: the monomer which is not included in the general formula (1)

Viscoat 1000 (manufactured by OSAKA ORGANIC CHEMICAL INDUSTRY LTD.): hyperbranched polymer Irgacure819, Irgacure1870, Irgacure127 (all of them are manufactured by Ciba Specialty Chemicals K.K.): polymerization initiator The ink compositions of Embodiments 1 to 8 and Comparative Examples 1 to 4 shown in Table 1 were evaluated with respect to the following list.

Film Curing Properties

Inks described in Embodiments and inks described in Comparative Examples were charged in RED nozzle arrays using an ink jet printer PX-G920 (manufactured by Seiko Epson Corporation). Under normal pressure, RED solid patterns (720×720 dots were printed per square inch at 10 ng of one dot) were printed on a PET film (an actually printed color is an ink color charged in RED nozzle arrays). Thereafter, ultraviolet rays having wavelengths of 365 nm, 380 nm and 395 nm were irradiated from an ultraviolet ray irradiating apparatus having an irradiation intensity of 150 mW/cm$^2$. When touch feeling of the sample surface is lost, it is determined that curing is accomplished. The curing properties were evaluated according to the following indexes.

AA: curing is accomplished by the irradiation for 1 minute

A: curing is accomplished by the irradiation for 3 minutes

B: curing is not accomplished by the irradiation for 5 minutes

Film Strength

The samples printed by the above-described method were cured by the ultraviolet rays using the same irradiating apparatus for 10 minutes. Just after curing, the film strengths were evaluated by the following indexes.

A: The surface is not scratched by a fingernail.

B: The surface is scratched by a fingernail.

Film Quality

The samples printed by the above-described method were cured by the ultraviolet rays using the same irradiating apparatus for 10 minutes. After curing, the samples were left under normal temperature and normal pressure for three days and the film qualities of the samples were observed and evaluated by the following indexes.

AA: The warpage of the film is not observed due to the film curing shrinkage.

A: The warpage of the film is observed by less than 3 cm due to the film curing shrinkage.

B: The warpage of the film is observed by 3 cm or more due to the film curing shrinkage.

Storage Stability

The ink compositions of Embodiments 1 to 8 and Comparative Examples 1 to 4 were left under an environment of 60° C. for 5 days and the initial viscosities (mPa·s) thereof and the viscosities thereof after being left were measured by a Rheometer (manufactured by Physica, MCR-300), and viscosity variation ratios were evaluated by the following indexes.

AA: The variation ratio of the initial viscosity to the viscosity after being left is ±10% or less.

A: The variation ratio of the initial viscosity to the viscosity after being left is ±20% or less.

B: The variation ratio of the initial viscosity to the viscosity after being left is greater than ±20%.

Flash Point

The flash points of the manufactured inks were measured using a Setaflash Closed Cup type flash point measurement device (Model. 13740-2 Tanaka Scientific Limited) and the flash points were evaluated by the following indexes.

A: 70° C. or more

B: less than 70° C.

The result of evaluating the film curing properties, the film strengths, the film qualities, the storage stabilities, and the flash points is shown in Table 2.

TABLE 2

|  | Embodiment | | | | | | | | Comparative Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Film curing properties | AA | A | AA | AA | AA | AA | AA | AA | B | B | B | AA |
| Film strength | A | A | A | A | A | A | A | A | A | A | A | B |
| Film quality | AA | AA | AA | AA | A | AA | AA | AA | AA | AA | AA | B |
| Storage stability | AA | AA | AA | AA | AA | A | AA | AA | B | — | — | AA |
| Flash point | A | A | A | A | A | A | A | A | A | B | B | A |

Embodiment B

Next, the film curing properties of several embodiments and comparative examples used in Embodiment A were evaluated with respect to several irradiating conditions. Table 3 shows the ink compositions used in Embodiment B. The numbers of the embodiments and the comparative examples correspond to those of Table 1. In Embodiment B, Embodiment 9, Comparative Examples 5 and 6, and Reference Examples 1 and 2 were added. In Embodiment 9, aminoketone (Irgacure369) is used as the photopolymerization initiator. In Comparative Examples 5 and 6, the hyperbranched polymer is not included. More in detail, Comparative Example 5 is the ink composition having the composition similar to International Unexamined Patent Application Publication No. WO03/089486 and Comparative Example 6 is the ink composition including a pre-polymer (curable resin 1) disclosed in the same publication. In Reference Examples 1 and 2, arylglycol and vinylether having excellent characteristics as an ink jet monomer are used similar to the VA.

The curable resin 1 of Table 3 was manufactured according to "resin synthesis example 4" of the best mode for carrying out the invention of the same publication. That is, in a 4-port flask of 1 L including an agitator, a thermometer, a rectification tower and a gas introduction pipe, 108 parts of acrylate, 750 parts of saturated polyesterpolyol resin (oligoester obtained by condensing 4-mol diethyleneglycol and 3-mol adipic acid: acid value is 3 and hydroxyl is 150), 24 parts of paratoluenesulfonic acid and 300 parts of toluene were added, azeotropic dehydration was performed under air stream at 115° C. for 10 hours, the internal temperature was cooled to a room temperature, cleaning was performed in 800 parts of a saturated sodium hydrogen carbonate aqueous solution two times and in 800 parts of deionized water, evaporation and dry were performed under the reduced pressure of 1,333 kPa at 90° C. for 5 hours, and polyestermethacrylate was obtained. The obtained polyestermethacrylate was curing resin 1.

The film curing properties were tested as follows.

Film Curing Properties

Using an ink jet printer PX-G920 (manufactured by Seiko Epson Corporation), the inks described in Embodiments, Reference Examples, and Comparative Examples are charged in a RED nozzle array. Under normal pressure, RED solid patterns (720×720 dots were printed per square inch at 10 ng of one dot) were printed on a PET film (an actually printed color is an ink color charged in RED nozzle arrays). Thereafter, ultraviolet rays having wavelengths of 365 nm, 380 nm and 395 nm were irradiated from an ultraviolet ray irradiating apparatus. An irradiation intensity is adjusted to 20, 40, 70, 100, 150 and 200 mW/cm$^2$. When touch feeling of the sample surface is lost, it is determined that curing is accomplished. The curing properties were evaluated according to the following indexes.

AAA: curing is accomplished by the irradiation of less than 45 seconds

AA: curing is accomplished by the irradiation of 45 to 90 seconds

A: curing is accomplished by the irradiation of 90 to 180 seconds

B: curing is accomplished by the irradiation of 180 seconds to 540 seconds

C: curing requires the irradiation of 540 seconds or more

The result of evaluating the film curing properties is shown in Table 4.

TABLE 3

|  |  | Embodiment |  |  |  | Reference Example |  | Comparative Example |  |  |
|---|---|---|---|---|---|---|---|---|---|---|
|  |  | 1 | 3 | 4 | 9 | 1 | 2 | 1 | 5 | 6 |
| Monomer | VA | 69.6 | 64.2 | 74.8 | 69.6 | — | — | — | 74.1 | 69.6 |
|  | arylglycol | — | — | — | — | 64.2 | — | — | — | — |
|  | 4-hydroxybutyl vinylether | — | — | — | — | — | 64.2 | — | — | — |
|  | Isobornyl acrylate | — | — | — | — | — | — | 69.6 | — | — |
|  | Diethyleneglycol monovinylether | — | — | — | — | — | — | — | 0.24 | — |
|  | Diethyleneglycol divinylether | — | — | — | — | — | — | — | 1.06 | — |
|  | Diethyleneglycol diacrylate | — | — | — | — | — | — | — | 0.1 | — |
|  | trimethylolpropane triacrylate | — | — | — | — | — | — | — | 10 | — |
| Hyperbranched polymer (viscoat 1000) |  | 15 | 20 | 10 | 15 | 20 | 20 | 15 | — | — |
| Curing resin 1 |  | — | — | — | — | — | — | — | — | 15 |
| Irgacure819 |  | 6 | — | 6 | — | — | — | — | 6 | 6 |
| Irgacure1870 |  | — | 6 | — | — | 6 | 6 | 6 | — | — |
| Irgacure127 |  | 2 | 2 | 2 | 2 | 2 | 2 | 2 | 2 | 2 |
| Irgacure369 |  | — | — | — | 6 | — | — | — | — | — |
| Pigment black-7 |  | 6 | — | — | 6 | — | — | — | 6 | 6 |
| Pigment blue-15:3 |  | — | — | — | — | — | — | 6 | — | — |
| Pigment violet-19 |  | — | 6 | — | — | 6 | 6 | — | — | — |
| Pigment yellow-155 |  | — | — | 6 | — | — | — | — | — | — |
| Dispersant (polyoxy alkylene polyalkylene polyamine) |  | 1.4 | 1.8 | 1.2 | 1.4 | 1.8 | 1.8 | 1.4 | 1.4 | 1.4 |

TABLE 4

|  | Embodiment | | | | Reference Example | | Comparative Example | | |
|---|---|---|---|---|---|---|---|---|---|
|  | 1 | 3 | 4 | 9 | 1 | 2 | 1 | 5 | 6 |
| 200 mW/cm$^2$ | AAA | AAA | AAA | AAA | AA | A | B | AA | AA |
| 150 mW/cm$^2$ | AAA | AAA | AAA | AAA | AA | A | B | AA | AA |
| 100 mW/cm$^2$ | AAA | AAA | AAA | AAA | AA | A | B | AA | AA |
| 70 mW/cm$^2$ | AAA | AAA | AAA | AAA | AA | A | B | B | B |
| 40 mW/cm$^2$ | B | B | B | B | B | B | C | B | B |
| 20 mW/cm$^2$ | C | C | C | C | B | B | C | C | C |
| Film strength | A | A | A | A | A | A | A | B | A |
| Film quality | AA | AA | AA | AA | AA | AA | AA | B | B |

In the ink composition of the present embodiment, it can be seen that excellent curing properties can be accomplished in a region in which the irradiation amount of the ultraviolet ray is 70 mW/cm$^2$. Reference Examples 1 and 2 are characterized in that the dependence on the irradiation intensity is low. The characteristic is inferior to the VA at a high illumination intensity but is superior to the VA at a low illumination intensity. Generally, if dots are formed by small liquid droplets, a curing failure is susceptible to occur due to oxygen inhibition, but, in the above embodiment, a good result was obtained in the liquid droplet unit of 10 ng.

The invention has industrial availability as a photo-curable ink composition which is excellent in storage stability, stability, curing properties, and film quality after curing, an ink jet recording method using the same, and a recorded material.

What is claimed is:

1. A photocurable ink composition comprising
   a dendritic polymer;
   a monomer expressed by $CH_2=CR^1-COO-R^2-O-CH=CH-R^3$
      wherein $R^1$ denotes a hydrogen atom or a methyl group, $R^2$ denotes an organic residue having 2 to 20 carbon atoms, and $R^3$ denotes a hydrogen atom or an organic residue having 1 to 11 carbon atoms; and
   a photo-polymerization initiator.

2. The photocurable ink composition according to claim 1, wherein the dendritic polymer is a dendrimer and/or a hyperbranched polymer.

3. The photocurable ink composition according to claim 1, wherein the monomer is 2-(vinyloxyethoxy) ethyl acrylate and/or 2-(vinyloxyethoxy)ethyl methacrylate.

4. The photocurable ink composition according to claim 1, wherein the concentration of the dendritic polymer is in a range from 3% by weight to 30% by weight.

5. The photocurable ink composition according to claim 1, further comprising a coloring material.

6. The photocurable ink composition according to claim 1, wherein the photopolymerization initiator is obtained by mixing any one kind or two or more kinds of α-aminoketone, α-hydroxyketone, and acylphosphine oxide.

7. An ink jet recording method comprising: discharging the photocurable ink composition according to claim 1 and irradiating said photocurable ink composition.

8. A recorded material made by the process of recording with the photo-curable ink composition according to claim 1.

* * * * *